Aug. 26, 1924.　　　　　　　　　　　　　　　　　1,506,635
R. H. HASSLER
SHOCK ABSORBER MOUNTING FOR VEHICLES
Filed June 5, 1922　　　　3 Sheets-Sheet 1

INVENTOR
Robert H Hassler,
By Raymond F. Buckley,
ATTORNEY

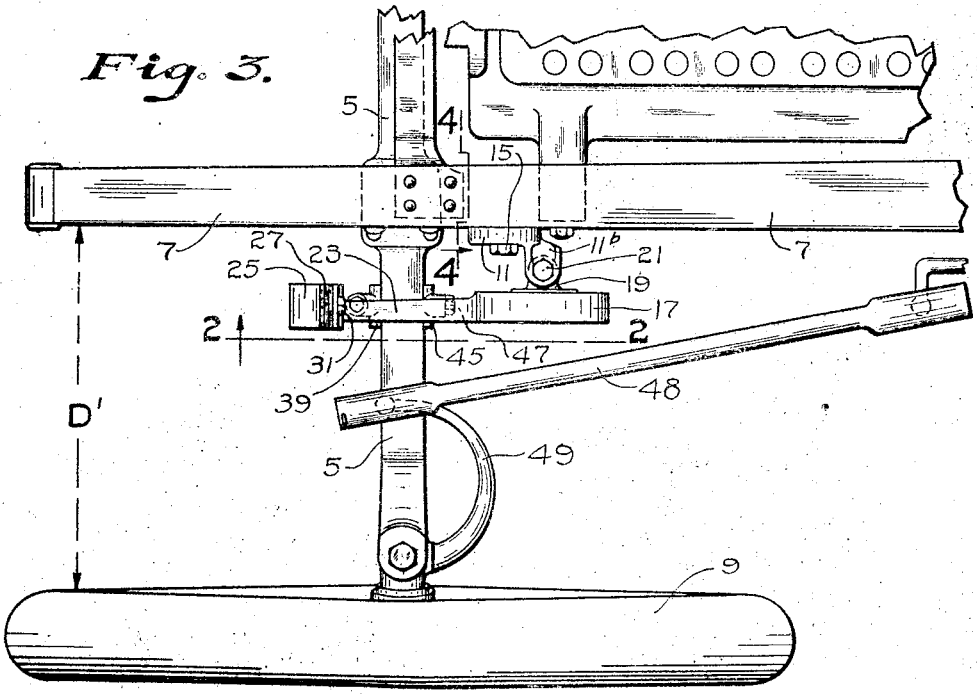
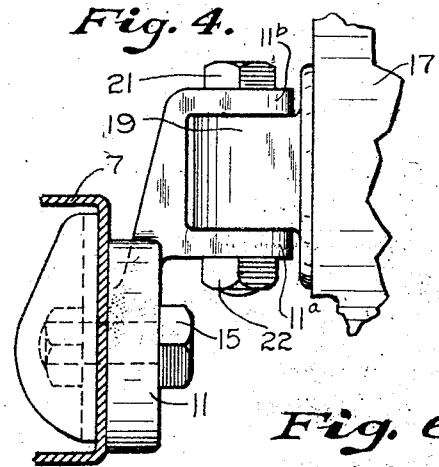
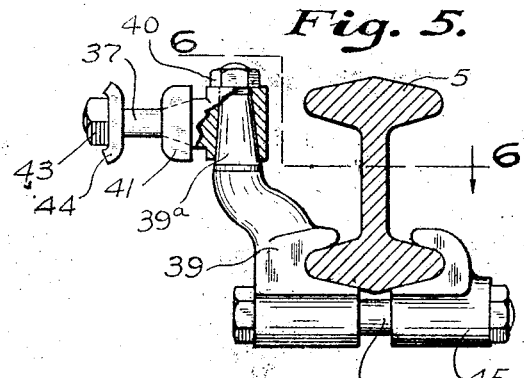
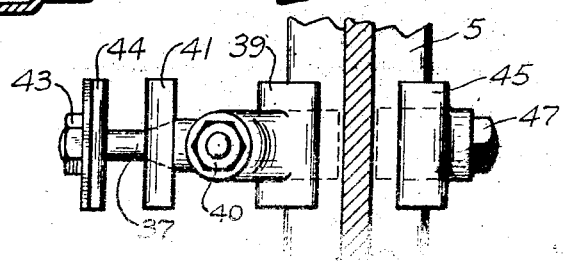
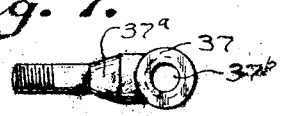

Aug. 26, 1924.  1,506,635
R. H. HASSLER
SHOCK ABSORBER MOUNTING FOR VEHICLES
Filed June 5, 1922  3 Sheets-Sheet 3
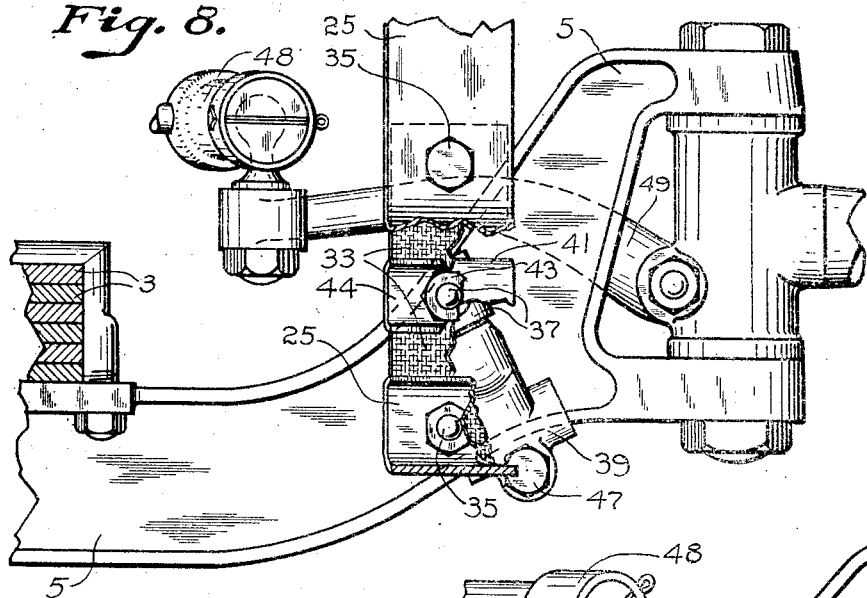
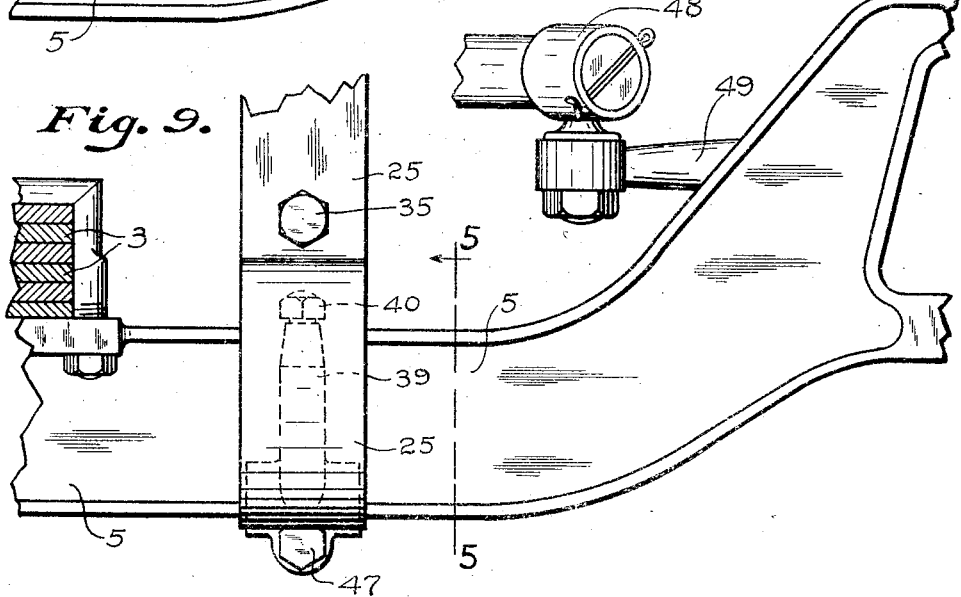
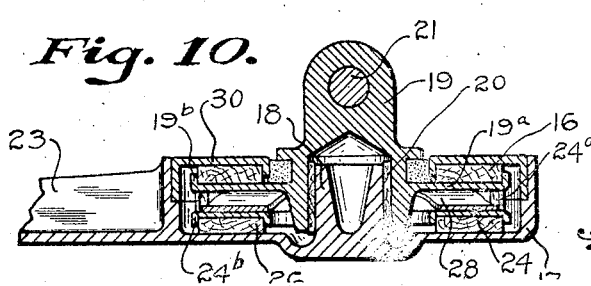
INVENTOR
Robert H. Hassler,
By Raymond F. Buckley,
ATTORNEY Patented Aug. 26, 1924.

1,506,635

UNITED STATES PATENT OFFICE.

ROBERT H. HASSLER, OF INDIANAPOLIS, INDIANA.

SHOCK-ABSORBER MOUNTING FOR VEHICLES.

Application filed June 5, 1922. Serial No. 565,814.

*To all whom it may concern:*

Be it known that I, ROBERT H. HASSLER, a citizen of the United States, residing at Indianapolis, in the county of Marion and State of Indiana, have invented certain new and useful Improvements in Shock-Absorber Mountings for Vehicles, of which the following is a specification.

The present invention relates generally to improvements in shock absorbing devices for motor vehicles and is more particularly directed to the provision of means for mounting shock absorbers on vehicles, and one of the objects of the invention is to improve the efficiency of the shock absorbers by reason of the peculiar and novel form of mounting. Another object of the invention is to provide means by which a standard form of shock absorbing device may be attached to miscellaneous vehicles of different sizes and shapes and still retain the best working conditions for the device.

A further object of the invention is to provide means for mounting and connecting shock absorbers which are capable of being shifted to various angles and positions on the vehicle, for the purpose of clearing the numerous obstructions encountered when making installations, and still maintain an approximately vertical line of connection between the upper and lower ends of the straps or rods that are used to transmit movement to the shock absorber.

With these and other objects in view, the invention consists of the construction, combination, and arrangement of parts hereinafter more fully described and claimed, and illustrated in the accompanying drawings, in which like characters of reference indicate like parts throughout the several figures, of which—

Figure 1:
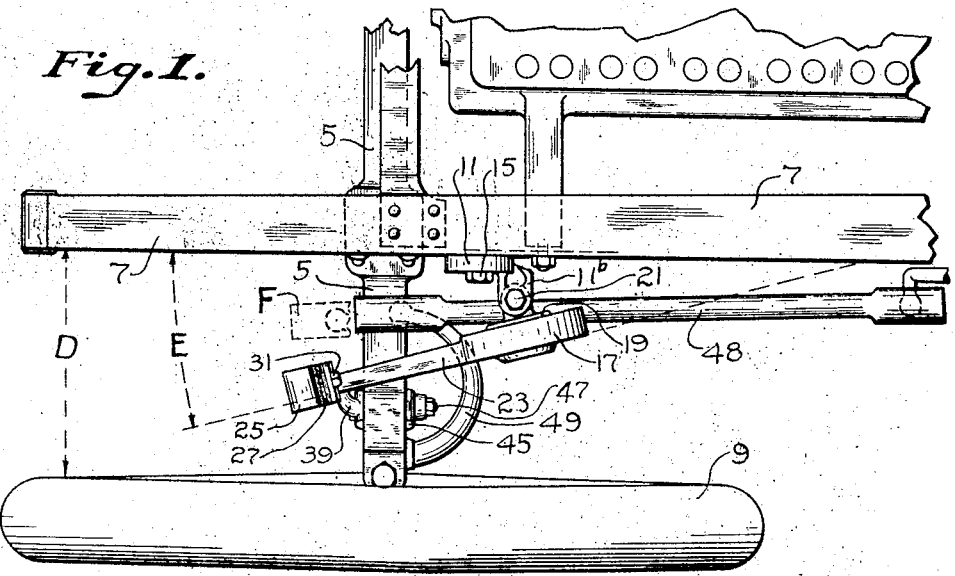
Figure 2:
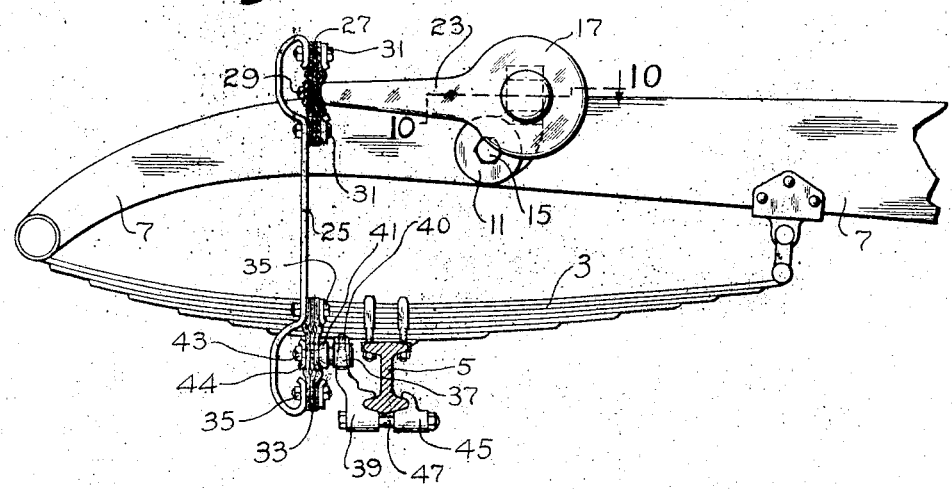

Figure 1 is a fragmentary plan view of a vehicle chassis illustrating the employment of my invention. Fig. 2 is a side elevation partly in section and taken on the line 2—2 in Fig. 3. Fig. 3 is another fragmentary plan view showing the improved system of mounting a shock absorber on a vehicle chassis of a differently constructed type. Fig. 4 is an end elevation of the frame support in which a fragment of the shock absorber is shown pivotally mounted and is taken on the line 4—4 of Fig. 3. Fig. 5 is a cross section on the line 5—5 in Fig. 9, and illustrates a side view of the swivel type axle bracket. Fig. 6 is a plan view of the axle bracket partly in section taken on the line 6—6 in Fig. 5. Fig. 7 is a plan view of the swivel bolt. Fig. 8 is a front view of the axle and axle bracket, and illustrates an inclined position of attachment of the bracket to the axle, and is an approximate front view of Fig. 1 showing a fragment only. Fig. 9 is a partial front view of the axle and attachment shown in Fig. 3, and shows the axle bracket dotted in a vertical position. Fig. 10 is a section of the shock absorber taken on the line 10—10 of Fig. 2.

Referring to the drawings, 3 is the main vehicle leaf spring which is secured intermediate its ends to the vehicle axle 5. 7 is the vehicle frame member, and 9 the vehicle wheel. The outer end of the vehicle spring 3 is pivoted to the usual horn or curved end of the frame 7, and the opposite end of spring 3 is shackled to an intermediate portion of the frame member 7 in the usual manner. The foregoing described parts are or may be of any well known or desired type.

The improved system for mounting shock absorbers on vehicles comprises a frame support 11 provided with extensions or ears $11^a$ and $11^b$, formed for pivotally attaching any desirable type of shock absorber or damping device; the frame support 11 being attached to the frame by means of bolt 15. For convenience of illustration, I have shown a friction type shock absorber provided with an attaching ear 19 for pivotally attaching the shock absorber to the frame support 11, for which a pivot bolt 21 and nut 22 are employed.

This friction type shock absorber contemplates the use of a center support or hub member 19 which contains a flanged portion or disk container $19^a$, from the outer periphery of which project a plurality of outturned lips or keys $19^b$. 20 is a cylindrical bush pressed into the central hollow portion of the hub member 19 forming a journal or bearing. Into disk container $19^a$ is pressed and securely held from rotating, the friction disk 16. 24 is a second disk container or flange, containing on its periphery a plurality of lips or keys $24^a$ which fit loosely between the keys $19^b$ on disk container $19^a$ thereby permitting an axial movement of the disk 24, with relation to the disk container $19^a$, but lock one with the other circumferentially. 26 is a second friction disk securely pressed into container 24 and held so as to be non-rotatable therein by the lips 24ᵇ. Interposed between container 19ᵃ and container 24, is an annular spring 28 in a state of compression, tending to press the two containers in an axial direction away from one another. 17 is an outer oscillating member containing a central shaft 18 engaging in the bush 20 and forming a pivot bearing therein. 23 is an actuator arm formed integral with the oscillating member 17. 30 is a hollow, cup-shaped cover securely held in the oscillating member 17 by being tightly pressed therein.

The actuator arm 23 is operatively connected to the axle element 5 in any suitable manner to respond to the vibrations of the axle and frame elements, which are caused by road inequalities. The spring 28 sets up a central internal friction pressure, transmitted through the containers 19ᵃ and 24, which retards and dampens the oscillatory movements of the actuator arm and therethrough control the action of the frame and body elements.

The actuator arm connection employed, to illustrate my invention, and is more clearly illustrated in Fig. 2 of the drawings, consists of a floating connecting member 25 which is connected to the free end of the actuator arm by means of an interposed pliable unit 27 and clamp bolt 29. The free ends of the pliable unit 27 are secured to the floating member, by means of the bolts 31. The lower end of the floating member 25, similarly to its upper end, has attached thereto a pliable unit 33, by means of the bolts 35, and the intermediate portion of the pliable unit is operatively attached to the axle by means of a swivel bolt 37, which forms a part of the axle bracket and is a part of my invention.

To overcome the angularity which results from mounting the axle bracket 39 according to the illustration in Fig. 8, I have provided a swivel clamp 41 having located centrally therein a taper aperture which is made to tighten on the taper shank 37ᵃ of swivel bolt 37, when tightened into engagement from the effect of the nut 43 and clamp plate 44. The swivel bolt is further provided with a taper socket 37ᵇ which, when mounted on the taper shank 39ᵃ of bracket 39, can be swung at any angle and securely held by means of nut 40 to accommodate the various angles which will result when applying the invention to automobiles of various types, typical cases of which are illustrated in Figs. 1 and 3. The axle bracket 39 is secured to the axle by means of the clamp 45 and the clamp bolt 47. 48 shows the steering drag link, and 49 the axle steering arm.

A comparison of relative distances between the vehicle frames and wheels of different types of vehicles is shown by D in Fig. 1 and by D′ in Fig. 3. It will be seen that the distance D of the vehicle shown in Fig. 1 is small and that the steering parts 48 and 49 lie close to the frame 7. Under these conditions, I set the shock absorber body 17 at an angle with the frame as shown by the dotted line E, in Fig. 1, and secure it in this position by clamp bolt 21. This angularity throws the member 25 toward the outer end of the axle 5 and away from interference with the steering parts 48 and 49. When the steering parts are in operation, the drag link 48 assumes the dotted position F in Fig. 1, and the clearance is so limited, that the space adjacent to the wheel 9 is the only available place where the member 25 is free from interference with 48 and 49.

On the other hand, where a vehicle as shown in Fig. 3 is to be equipped, the space between the drag link 48 and frame 7 is the most available place for the member 25. Under these vehicle conditions, I secure the shock absorber body 17 parallel to the frame 7 by means of the frame support 11, ear 19, and the clamp bolt 21. This brings the member 25 inside, or between the steering parts 48 and 49 and the frame 7, and to a more central part of the axle 5.

By swiveling the shock absorber body to different angles, I thus accommodate it to widely differing types of vehicles and assure efficient shock absorbing action without interference from a variety of vehicle conditions.

It will be seen that the variation in the design of the vehicles illustrated in Fig. 1 and Fig. 3 present conditions such that a desirable installation of the shock absorber will require different locations of the bracket 39 on the axle 5. In Fig. 1 this position is near the outer end of the axle, while in Fig. 3 it is more centrally located. Most vehicle axles present different shapes at these two places, the central parts usually being horizontal and the outer parts inclined. For this reason I make the bracket parts, clamp 41 and swivel bolt 37 of such a character as to give an efficient connection with the member 25 in spite of varying inclination of that part of the axle 5 which supports bracket 39.

It is obvious that many modifications and changes may be made in my invention without departing from the spirit thereof; and I do not mean to limit myself to the exact construction shown and described.

Having thus described my invention, what I claim as new and desire to secure by Letters Patent, is:

1. In a device of the class described, in combination with a frame element, an axle element, and a spring element supporting the frame element, a shock absorber, an actuator arm outwardly disposed from said shock absorber and connected to the axle element, and pivotal means for mounting the shock absorber on the frame element, said means being adapted to permit a lateral movement of said actuator arm and said shock absorber in a horizontal plane.

2. In a shock absorber mounting system comprising a vehicle frame element, a spring element supporting the frame element, an axle element supporting the spring and frame elements, a shock absorber, an oscillating actuator arm outwardly disposed from said shock absorber and connected to the axle element, pivotal means for mounting said shock absorber on the frame, said means being adapted to permit a pivotal movement of said shock absorber in a horizontal plane.

3. In a device of the class described, in combination with a frame element, an axle element and an interposed spring element, a shock absorber having an outwardly disposed actuator arm connected with the axle element, an axis for said shock absorber pivoted on said frame element whereby it is adapted to be swung in a horizontal plane, said shock absorber being oscillatable about said axis.

4. In a retarding check mechanism mounting system comprising a vehicle frame element, a spring element supporting said frame element, an axle element supporting the spring and frame elements, a retarding check mechanism, an actuator arm for operating said check mechanism, a support mounted on said frame element, said support provided with means for pivotally mounting said check mechanism to permit an approximately horizontal radial range of adjustment, connecting means for attaching the actuator arm to the vehicle axle to respond to vibrations of the axle and frame elements for functioning said check mechanism, said connecting means comprising a bracket having attaching means for securing it to the axle, a taper shank extending outward therefrom, a clamp bolt mounted on said shank susceptible of radial adjustment at right angles to said axle bracket.

5. In a retarding check mechanism mounting system comprising a vehicle frame element, a spring element supporting said frame element, an axle element supporting the spring and frame elements, a retarding check mechanism, an actuator arm for operating said check mechanism, a support mounted on said frame element, said support provided with means for pivotally mounting said check mechanism to permit an approximately horizontal radial range of adjustment, connecting means for attaching the actuator arm to the vehicle axle to respond to vibrations of the axle and frame elements for functioning said check mechanism, said connecting means comprising a bracket having attaching means for securing it to the axle, a taper shank extending outward therefrom, a clamp bolt mounted on said shank susceptible of radial adjustment at right angles to said axle bracket, said clamp bolt provided with adjustable clamping means for attachment in an approximately vertical plane to the actuator arm.

In witness whereof, I, have hereunto set my hand and seal at Indianapolis, Indiana, this 2nd day of June, A. D., one thousand nine hundred and twenty-two.

ROBERT H. HASSLER. [L. S.]